United States Patent
Ray et al.

(10) Patent No.: US 6,440,533 B1
(45) Date of Patent: Aug. 27, 2002

(54) PVC REPLACEMENT FILM

(75) Inventors: Carl Douglas Ray, Terre Haute, IN (US); James Peter DiPoto, Neenah, WI (US); Shailesh Chunilal Patel, Terra Haute, IN (US)

(73) Assignee: Tredegar Film Products Corporation, Richmond, VA (US)

( * ) Notice: Subject to any disclaimer, the term of this patent is extended or adjusted under 35 U.S.C. 154(b) by 118 days.

(21) Appl. No.: 09/667,383

(22) Filed: Sep. 22, 2000

(51) Int. Cl.$^7$ .................................................. B23B 3/00
(52) U.S. Cl. ........................ 428/172; 428/174; 428/447; 428/516; 264/46.3; 264/173.19; 264/173.14
(58) Field of Search ................................. 428/516, 156, 428/172, 174, 447; 264/46.2, 46.3, 540, 173.19, 173.14

(56) References Cited

U.S. PATENT DOCUMENTS

| | | | |
|---|---|---|---|
| 4,457,960 A | 7/1984 | Newsome | 428/35 |
| 4,524,099 A | 6/1985 | Di Luccio | 428/213 |
| 4,988,465 A | 1/1991 | Lustig et al. | 264/22 |
| 5,156,789 A | 10/1992 | Amaral et al. | 264/160 |
| 5,188,895 A | 2/1993 | Nishino et al. | 428/373 |
| 5,212,001 A | 5/1993 | Brant et al. | 428/34.9 |
| 5,360,648 A | 11/1994 | Falla et al. | 428/35.2 |
| 5,419,934 A | 5/1995 | Wilson | 428/34.9 |
| 5,427,807 A | 6/1995 | Chum et al. | 426/393 |
| 5,492,757 A | 2/1996 | Schuhmann et al. | 428/329 |
| 5,523,136 A | 6/1996 | Fischer et al. | 428/35.2 |
| 5,614,315 A * | 3/1997 | Kondo et al. | 428/332 |
| 5,741,565 A | 4/1998 | Coosemans et al. | 428/35.2 |
| 5,789,046 A | 8/1998 | Mueller | 428/35.2 |
| 5,843,540 A | 12/1998 | Heydarpour et al. | 428/35.2 |
| 5,846,620 A | 12/1998 | Compton | 428/35.7 |
| 5,888,640 A | 3/1999 | Marotta et al. | 428/308.4 |
| 5,902,684 A * | 5/1999 | Bullard et al. | 428/515 |
| 5,910,374 A | 6/1999 | Shah | 428/474.4 |
| 5,922,441 A * | 7/1999 | Eichbauer | 428/213 |
| 5,962,092 A | 10/1999 | Kuo et al. | 428/34.9 |
| 5,972,443 A | 10/1999 | Breck et al. | 428/35.2 |
| 6,027,776 A | 2/2000 | Mueller | 428/35.2 |
| 6,093,480 A * | 7/2000 | Eichbauer | 428/213 |
| 6,299,968 B1 * | 10/2001 | Karaoglu et al. | 428/213 |

FOREIGN PATENT DOCUMENTS

| | | |
|---|---|---|
| GB | 2341135 | 3/2000 |
| JP | 10119206 | 5/1998 |
| JP | 2000188966 | 7/2000 |

OTHER PUBLICATIONS

Encyclopedia of Polymer Science and Engineering, "Ethylene Polymers", Low Density Polyethylene, vol. 6, pp 386–387, 1985I.*

* cited by examiner

Primary Examiner—D. Lawrence Tarazano
(74) Attorney, Agent, or Firm—Jenkens & Gilchrist, P.C.

(57) ABSTRACT

A coextruded multilayer film laminate featuring a polyolefin based formulation which closely matches the mechanical performance criteria of a plasticized PVC film is disclosed. This film is particularly suitable for use as a replacement film for plasticized PVC in a variety of medical and non-medical applications. The multilayer films of the present invention offer a particular set of mechanical properties, normally associated with plasticized PVC, including easy stretch, high degree of recovery, low fatigue and minimal permanent set. Moreover, these polyolefin based formulations do not contain any known or suspected carcinogenic compounds and may be produced at costs that are highly competitive with the costs associated with a conventional, plasticized PVC film.

36 Claims, 1 Drawing Sheet

PVC REPLACEMENT FILM

FIELD OF THE INVENTION

The present invention pertains to a multilayer film and a method of manufacture therefor. Specifically, the multilayer film of the present invention features a polyolefin based material which closely replicates the mechanical properties normally associated with a film of plasticized polyvinylchloride (PVC). This material is particularly suitable for use as a substrate for bandages and surgical dressings, but the film of the present invention is not limited to only medical applications and could be used as a substrate material in other PVC based articles.

BACKGROUND OF THE INVENTION

Solution cast, plasticized polyvinylchloride (PVC) films are frequently used as substrates for bandages and similar disposable articles. Plasticized PVC films are used in these applications primarily because they offer a particular set of mechanical properties. Plasticized PVC films possess desirable properties including easy stretch, high degree of recovery, low fatigue and minimal permanent set. However, plasticized PVC film has become less desirable because of known or suspected carcinogens associated with both the PVC monomer and the various plasticizers used in its production. Obviously, given the widespread use of these films in bandages and other medical applications where the polymer substrate may come into direct contact with open skin, blood, and other bodily fluids, it would be highly desirable to produce a new polymeric film which behaves mechanically like a plasticized PVC film, but is formed of materials that are free of suspected or known carcinogenic components.

Such a substitute or replacement film for plasticized PVC film has been desired for some time. One category of polymer films, polyolefins, are quite common and are used in a wide variety of applications. However, polyolefins in general do not recover from stretching as well as plasticized PVC films do. Ideally, a PVC replacement film will stretch easily, but recover completely. An ideal film would not fatigue or retain a permanent set. Additionally, if a substitute material could also provide improved breathability (i.e. higher MVTR) as compared to plasticized PVC film, this would also be a plus.

In short, there is a need for polymeric films which can replace plasticized PVC films in a variety of medical and non-medical applications. Specifically, there is a need for polyolefin based materials which have similar hysteresis (stress/strain) characteristics to plasticized PVC film as well as having a similar folding and conforming nature to plasticized PVC films.

SUMMARY OF THE INVENTION

The present invention discloses a coextruded multilayer film particularly adapted for use as a replacement film for plasticized PVC in a variety of medical and non-medical applications. It has been discovered that polyolefin based formulations exist that closely match the mechanical performance criteria of a control plasticized PVC material. These polyolefin based formulations do not contain any known or suspected carcinogenic compounds and may be produced at costs that are highly competitive with the costs associated with a conventional plasticized PVC film.

In one preferred embodiment, the multilayer film of the present invention comprises a core layer which is coextruded and disposed between two outer skin layers. The core layer is generally about 65% to about 95% of the multilayer film thickness, and the two exterior skin layers are each about 2.5% to about 17.5% of the multilayer film thickness. One preferred material for the core layer is a blend of metallocene ultra low density polyethylene (ULDPE) polyolefin plastomer and an ethylene methyl acrylate (EMA) copolymer. Each coextruded skin layer may be made of another polyolefin blend such as linear low density polyethylene (LLDPE) and low density polyethylene (LDPE).

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE INVENTION

Figure 1:
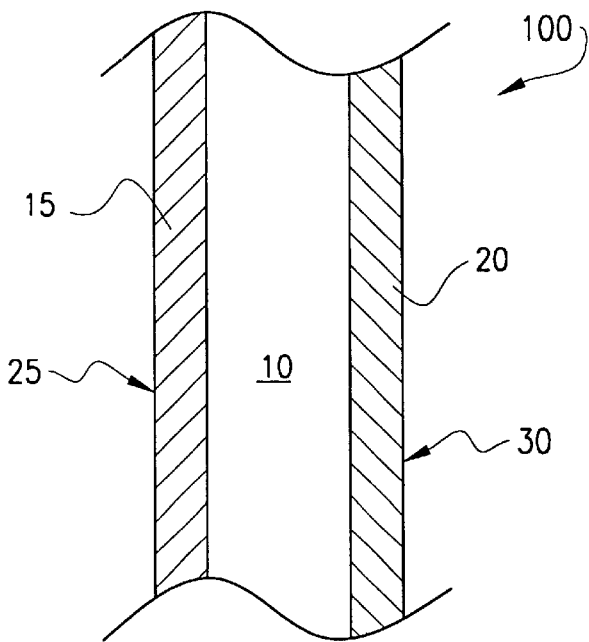
FIG. 1 is a cutaway view of a multilayer film, according to the present invention.

With reference now to FIG. 1, a multilayer film 100 according to the present invention is depicted in a cutaway side view. In one preferred embodiment the multilayer film 100 is a three layer film having a core layer 10 which is disposed between two exterior skin layers 15, 20.

The core layer 10 is normally about 65% to about 95% of the total multilayer film 100 thickness T, and in one preferred embodiment the core layer 10 is about 75% to about 85% of the total thickness T. Consequently, the two exterior skin layers 15, 20 are each about 2.5% to about 17.5% of the multilayer film 100 thickness T, and in one preferred embodiment the two exterior skins layers 15, 20 are each about 7.5% to about 12.5% of the total thickness T.

It has been discovered that one polyolefin based formulation which is suitable for use as a core 10 material is a blend of metallocene ultra low density polyethylene (ULDPE) polyolefin plastomer, such as Dow PL1280, and an ethylene methyl acrylate (EMA) copolymer, such as Exxon TC120. Typically, the core layer 10 will be a blend of about 55% to about 75% metallocene ULDPE and about 25% to about 45% EMA copolymer. In a more preferred embodiment, the core layer 10 will be a blend of about 55% to about 60% metallocene ULDPE and about 40% to about 45% EMA copolymer. Please note that, unless specified otherwise, the blend percentages provided herein are understood to be on a weight percent (wt%) basis.

One desirable blend which may be used in each of the exterior skin layers 15, 20 is made up of linear low density polyethylene (LLDPE), such as Dow 2517, and a low density polyethylene (LDPE), such as Chevron 1017. Each exterior skin layer 15, 20 will normally be a blend of about 45% to about 55% LLDPE and about 45% to about 55% LDPE. In one preferred embodiment each exterior skin layer 15, 20 will be a blend of about 50% LLDPE and about 50% LDPE.

Several alternative embodiments of the multilayer film 100 according to the present invention have also been discovered. One alternative embodiment involves the substitution of an ethylene vinyl acetate (EVA) copolymer in place of the EMA copolymer. It has been observed that the EVA material may be substituted on a one-for-one weight percent (wt%) basis with the EMA material in the core layer 10 with very little change in the overall mechanical properties of the multilayer film 100.

Another alternative material which has been tested for use in the core layer 10 is a family of atactic polypropylene (PP) materials which possess the hysteresis or stress/strain characteristics necessary to be considered for a replacement of plasticized PVC. Atactic polypropylene materials are created using specialized catalysts and are also commonly referred to as flexible polyolefins (FPO), and are commercially available from companies such as Huntsman (WL201) and Montell (Catalloy). Additionally, syndiotactic polypropylenes from Fina were also considered and have been thought to give similar results. Note that in cases where specialty polypropylene materials are used, they comprise 100% of the core layer 10 in the multilayer film 100.

It is also desirable in producing a multilayer film 100 to provide the film 100 with an embossed exterior surface on a first side 25, a second side 30, or both sides of the multilayer film 100. It was noted that of the various materials which were suited for use in the core layer 10, many of these materials tended to adhere aggressively to the embossing roll. It was at least in part to overcome this propensity that the blended LLDPE/LDPE skin layers 20 were added to multilayer film 100. It was also discovered that by using a "fine" embossed pattern such as matte, FS II, or JMAC I, the resulting coextruded film 100 can be deglossed to give the film 100 an attractive dull finish while maintaining the desired hysteresis characteristics. In all of the embodiments disclosed, the coextruded film may be direct cast embossed using an engraved pattern of choice. In one preferred embodiment, either an FS II (a regular, repeating, square cell pattern with about 145 cells/inch) or JMAC I (an offset, repeating, circular cell pattern with about 22 cells/inch) is desirable as it is believed that these patterns do not alter the base hysteresis characteristics of the film and the patterns give the film an attractive dull finish (e.g. 45 degree gloss of about 3.0 to about 7.0) that is often desired in the marketplace.

Additionally, it should be noted that the multilayer films described herein may also be corona treated on one exterior side to satisfy the printing needs of consumers. It should also be noted that the core and skin polymers may also have select additives incorporated into the blend in very low concentrations (about 0.10% to about 2.0%) of titanium dioxide or other colorants or pigmenting materials to again provide the multilayer film 100 of the present invention with a desired appearance.

An additional disclosure applicable to each of the embodiments above includes the addition of a siloxane polymer into at least one skin layer 15, 20 to improve the refastenability characteristics of a bandage or other finished article. This refastenability characteristic is often referred to as a differential release property.

In short, differential release refers to a material such as a multilayer film 100 of the present invention in which a first side 25 and a second side 30 possess different affinities for an adhesive coating or glue. For example, in a bandage, it may be desirable to have a first side 25 to which an adhesive coating, not shown, may be applied and should remain attached thereto, and a second side 30, which is generally the exterior side of the bandage but which may come into contact with the adhesive on the first side 25 as the bandage is applied and wrapped around a finger or other part of the body. In this example, it is desirable that the first side 25 of the multilayer film 100 has a greater affinity for the adhesive than the second side 30 does. This allows the adhesive layer, not shown, to remain attached to the first side 25 when applied to the skin or other surfaces, and also allows the adhesive to be peeled away from the second side 30 if the bandage is overlapped.

One way to achieve a differential release for a multilayer film 100 is to incorporate a low surface energy material such as a siloxane polymer into one skin layer 20 to make its exterior surface 30 more resistant to an adhesive or glue than the exterior surface 25 of the other skin layer 15. This has been done successfully by incorporating a small amount of ultra-high-molecular-weight functionalized siloxane polymer, such as master batch MB50-313 available from Dow Corning, into one of the skin layers 20. Master batch MB50-313 is a 50/50 wt % blend of ultra high molecular weight siloxane polymer and LLDPE resin. Several experimental samples have been made incorporating between about 1.0% to about 10.0% additions of MB50-313 added to a single skin layer of 20. In one preferred embodiment, between about 2.5% to about 3.5% MB50-313 is incorporated into a single skin layer 20. This skin layer 20 would thus comprise about 50% LLDPE (Dow 2517), about 46.5% to about 47.5% LDPE (Chevron 1017), and about 2.5% to about 3.5% master batch polymer blend (MB50-313). Thus, in this particular embodiment, the ultra-high molecular weight functionalized siloxane polymer content of the resulting skin layer 20 would be about 1.25% to about 1.75%.

Additional additives which may also be used to develop a differential release characteristic in a multilayer film 100 include: synthetic silica such as Grace Siloblock 45, Behenamide organic antiblock, or Fuji Sylesia at 6 and 12 micron particle size; cross-linked silicone spherical particles such as Toshiba GE Tospearl; hollow glass spheres such as Zeospheres; and treated talc. These materials may be blended with the LLDPE/LDPE skin layer 20 at appropriate levels to develop the controlled release desired.

Figure 2:
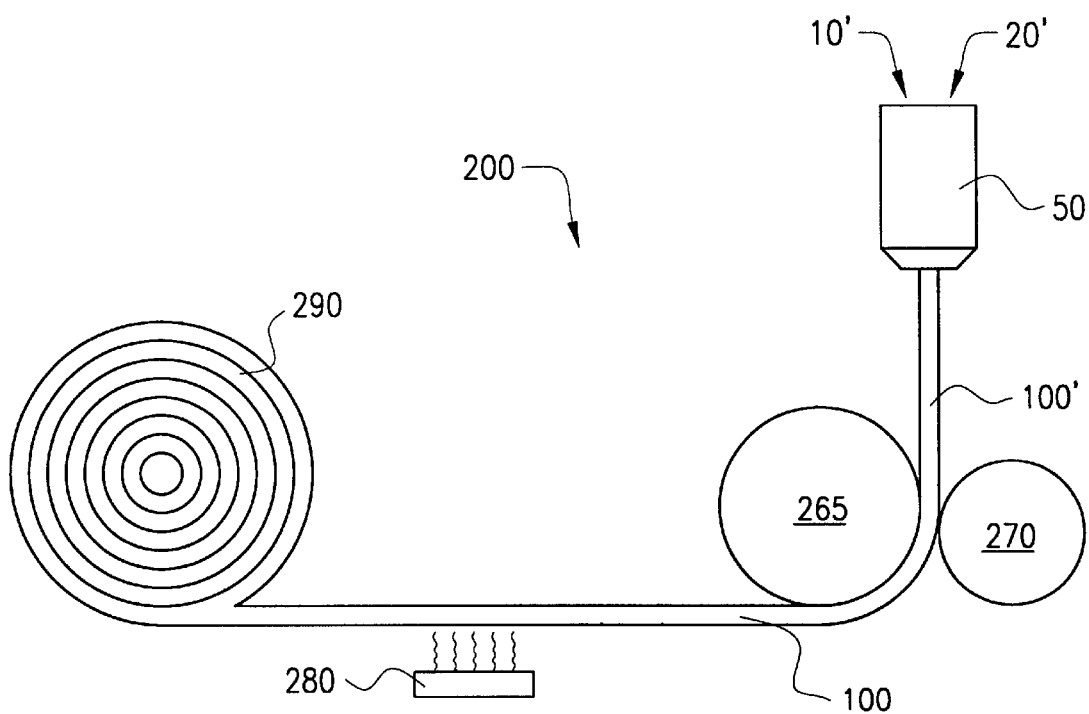
FIG. 2 is a side elevational view of a conventional matte embossing arrangement.

A method of manufacturing a multilayer film 100 according to the present invention will now be disclosed. As best seen in FIG. 2, a simplified manufacturing line 200 for making the multilayer film 100 is illustrated. Prior to forming the multilayer film 100, it is necessary to blend a core composition and at least one skin composition in separate extruders or mixers, not shown, as known in the art. The core composition 10' and the at least one skin composition 20' are fed simultaneously into a slotted film casting die 50 and coextruded to form a multilayer film 100' with a core layer 10 and at least one skin layer 20. The multilayer film 100' is then embossed using a nip roll apparatus 260 which has a metal embossing roll 265 and a rubber roll 270. As the multilayer film 100' is pressed between the metal embossing roll 265 and the rubber roll 270, it is possible to impart an embossed finish onto one or both sides of the multilayer film 100'. The embossed multilayer film, now referred by the numeral 100, is then allowed to cool and taken up on rolls 290, as known in the art. Optionally, the line may further include a corona discharge bar 280 for corona treatment of at least one side of the film for later printing. It should be further noted that the multilayer film 100 may subsequently be printed, apertured, coated with an adhesive and a backing sheet, and cut into various shapes and sizes to form finished articles such as bandages.

By way of example only, test data for several PVC replacement films according to the present invention is collected in Table 1 below. The four example films are three layer coextruded films having a core layer of about 58% metallocene ULDPE polyolefin plastomer and about 42% EMA copolymer; a first exterior skin layer of about 50%

LLDPE and about 50% LDPE; and a second exterior skin layer of about 50% LLDPE, about 47% LDPE, and about 3% master batch siloxane polymer blend. The core layer in each film is about 80% of the overall thickness and the skins are each about 10% of the overall thickness. The films were also fine embossed with an FS II or JMAG I pattern on one side, although this does not appear to measurably affect mechanical properties. The plasticized PVC film data shown in Table 1 is provided for comparison purposes only, and it should serve to give an indication of how closely the polyolefin based films of the present invention replicate the mechanical properties of a typical plasticized PVC film in use today.

TABLE 1

|  |  | PVC | Ex. 1 | Ex. 2 | Ex. 3 | Ex. 4 |
|---|---|---|---|---|---|---|
| Basis Weight (g/m$^2$) |  | 102.7 | 49.0 | 51.5 | 54.3 | 60.2 |
| Thickness by Weight ($\mu$) |  | 98.3 | 53.5 | 56.2 | 59.1 | 65.8 |
| Specific Gravity (g/cc) |  | 1.045 | 0.916 | 0.917 | 0.918 | 0.916 |
| Tensile Strength | MD | 1096 | 1591 | 1148 | 1280 | 1532 |
| at Break (g/cm) | TD | 1017 | 1210 | 883 | 1019 | 1966 |
| Elongation | MD | 182 | 647 | 286 | 284 | 710 |
| at Break(%) | TD | 188 | 682 | 497 | 502 | 676 |
| 5% Stress | MD | 100 | 70 | 109 | 125 | 157 |
| (g/cm) | TD | 91 | 123 | 123 | 139 | 145 |
| 10% Stress | MD | 191 | 164 | 200 | 225 | 238 |
| (g/cm) | TD | 175 | 190 | 197 | 218 | 234 |
| Elmendorf Tear | MD | 1.03 | 5.18 | 2.65 | 3.06 | 6.08 |
| (g/$\mu$) | TD | 1.03 | 12.87 | 14.73 | 15.96 | 12.48 |
| Gurley Flexural | MD | 26.64 | 18.87 | 17.39 | 14.43 | 10.73 |
| Stiffness (mg) | TD | 14.98 | 15.91 | 11.10 | 15.17 | 10.73 |
| Coefficient of Friction Static (film/steel) | F | 0.80 | 0.24 | 0.29 | 0.31 | 0.35 |
|  | M | 1.01 | 0.39 | 0.35 | 0.39 | 0.39 |
| Coefficient of Friction Kinematic (film/steel) | F | 0.52 | 0.26 | 0.33 | 0.34 | 0.37 |
|  | M | 0.65 | 0.46 | 0.37 | 0.41 | 0.43 |
| Haze (%) |  |  | 89.4 | 93.2 | 91.3 | 91.9 | 94.3 |
| Low Load Thickness ($\mu$) |  | 111 | 75 | 129 | 128 | 78.3 |
| TD Force at 25% Strain (g/cm) |  | 373 | 237 | 242 | 263 | 295 |
| TD Force Relaxation at 25% Strain (%) |  | 49 | 18 | 18 | 23 | 18 |
| TD Permanent Set at 25% Strain (%) |  | 1.8 | 2.3 | 2.1 | 2.2 | 2.1 |
| TD Force at 50% Strain (g/cm) |  | 581 | 272 | 270 | 289 | 329 |
| TD Force Relaxation at 50% Strain (%) |  | 54 | 19 | 22 | 23 | 19 |
| TD Permanent Set at 50% Strain (%) |  | 5.5 | 4.9 | 6.7 | 6.1 | 5.3 |

In Table 1, the abbreviations MD and TD are understood to refer to the machine direction (MD) and the transverse direction (TD) of the film. The machine direction of a film may be defined as the direction in which the film is pulled during its production or the direction in which the film is taken up onto rolls. The transverse direction (TD) may be defined as being perpendicular to the MD within the plane of the film. Mechanical properties are measured in this manner because long chain molecules within polymer films tend to become oriented in the direction of strain, usually the machine direction in cast films. Also, please note that the abbreviations F and M are understood to refer to the female (i.e. embossed or steel roll) side of the film and the male (i.e. rubber roll) side of the film. Note that the data provided on the plasticized PVC film is intended to be representative of a typical commercial film of this type, but that properties may be somewhat higher or lower depending on the manufacturer and batch tested.

Hysteresis properties, namely force relaxation and permanent set, are often measured in accordance with a laboratory test procedure utilizing a test instrument which applies a load to a specimen through a constant rate of motion. By way of example only, one such test instrument is an Instron Tensile Tester—Model #1130. The test procedure is run in two parts on each specimen. The first cycle applies a load to the specimen and places the sample in tension to achieve the desired strain (% elongation), holds at that strain for a designated time, and then returns to an unloaded condition. The curve which is generated during this cycle is used to calculate force relaxation. The second cycle applies a load and places the sample in tension to obtain the desired strain (% elongation) as in the first cycle, holds that strain for a designated time, and then returns to an unloaded condition. The tensile set or permanent set is calculated from this second curve.

For the hysteresis data of Table 1, specimens are taken from various areas across the film and are cut 1.0 inch wide by about 7.0 inches long. The polymer test samples should be free of surface damage, wrinkles, and blemishes which might have a detrimental effect on the test results. Testing is carried out at about 73±2° F. and a humidity of about 50%±2%. After the testing machine is calibrated, the desired % elongation is set using an upper limit stop. A test specimen is placed in the jaws of the tensile testing machine which are set 3.0 inches apart (original gage length), the jaws are moved apart at a rate of 20 inches/minute to reach the desired % elongation and the force (f1) is noted. The sample is held for 30 seconds at the desired % elongation and the force (f2) is noted again. The sample is then returned to a no load condition. After a rest period of 30 seconds, the test sample is again cycled to the desired % elongation, held for 30 seconds, and returned to zero load. During this second cycle, the take-up distance or elongation (a) of the film before the film resists deformation and a load is applied by the testing machine is noted.

After the test data is collected, it is possible to compute the force relaxation and the permanent set for each sample. Force relaxation is defined as the loss in force (f1−f2) during the hold phase of the first test cycle. The loss may be expressed as a force relaxation %=(f1−f2)/f1*100%. Permanent set, also known as tensile set, is a measure of permanent deformation of the sample as a result of the initial elongation, hold, and relax procedure. The permanent set is the ratio of elongation (a) of the sample before a load is applied, as measured in the second test cycle, divided by the original gage length of the sample. This may also be expressed as a permanent set %=a/gage length*100%.

It is also notable that in many cases the replacement films not only reproduce the hysteresis characteristics of the plasticized PVC film, but are actually physically superior in other mechanical properties. For example, the replacement films have significantly lower specific gravity and may be made thinner than conventional plasticized PVC films, which means that it will require less weight of raw polymer to manufacture the same area of film. Moreover, properties including Elmendorf tear and elongation at break are also greatly improved by the additional stretch before failure which is provided by the polyolefin films. Also, the coefficient of friction is significantly reduced which allows the replacement films to be handled at higher line speeds and with less mechanical resistance.

Although preferred embodiments of the invention have been described in the Examples and foregoing Detailed Description, it will be understood that the invention is not limited to the embodiments disclosed, but is capable of numerous rearrangements and modifications of parts and elements without departing from the spirit of the invention as defined in the following claims. Therefore, the spirit and the scope of the appended claims should not be limited to the description of the preferred embodiments contained herein.

What is claimed is:

1. A multilayer film comprising:

a core layer of a metallocene catalyzed ULDPE polyolefin plastomer/ethylene copolymer blend;

at least one skin layer of a LLDPE/LDPE blend coextruded on either side of said core layer to form a multilayer film;

said multilayer film having a machine direction stress at 5% elongation of about 60 g/cm to about 160 g/cm; and said multilayer film having a transverse direction stress at 5% elongation of about 100 g/cm to about 170 g/cm.

2. The multilayer film of claim 1, said multilayer film having a transverse direction force relaxation of about 10% to about 30% following a 25% strain.

3. The multilayer film of claim 1, said multilayer film having a transverse direction permanent set of about 1.0% to about 3.0% following a 25% strain.

4. The multilayer film of claim 1, said multilayer film having a transverse direction force relaxation of about 10% to about 30% following a 50% strain.

5. The multilayer film of claim 1, said multilayer film having a transverse direction permanent set of about 4.0% to about 7.5% following a 50% strain.

6. The multilayer film of claim 1, wherein said core layer is about 65% to about 95% of said multilayer film thickness, and said at least one skin layer is about 5.0% to about 35% of said multilayer film thickness.

7. The multilayer film of claim 1, wherein said ethylene copolymer of said core layer is ethylene methyl acrylate.

8. The multilayer film of claim 1, wherein said ethylene copolymer of said core layer is ethylene vinyl acetate.

9. The multilayer film of claim 1, wherein said multilayer film is embossed on at least one side.

10. The multilayer film of claim 9, wherein said at least one embossed side has a 45 degree gloss of about 3.0 to about 7.0.

11. The multilayer film of claim 1, wherein said at least one skin layer further comprises about 0.5% to about 5.0% siloxane resin.

12. The multilayer film of claim 1, wherein said at least one skin layer further comprises about 1.25% to about 1.75% siloxane resin.

13. The multilayer film of claim 1, wherein said at least one skin layer further comprises a release agent selected from the group consisting of synthetic silica, hollow glass spheres, treated talc, and cross-linked silicone particles.

14. The multilayer film of claim 1, wherein said core layer is about 55% to about 75% metallocene catalyzed ULDPE polyolefin plastomer and about 25% to about 45% EMA.

15. The multilayer film of claim 1, wherein said at least one skin layer is about 45% to about 55% LLDPE and about 45% to about 55% LDPE.

16. The multilayer film of claim 1, wherein said multilayer film has a machine direction tensile strength at break of about 1100 g/cm to about 1600 g/cm, and a transverse direction tensile strength at break of about 850 g/cm to about 2000 g/cm.

17. The multilayer film of claim 1, wherein said multilayer film has a machine direction elongation at break of about 250% to about 750%, and a transverse direction elongation at break of about 450% to about 750%.

18. A multilayer film comprising:

a core layer of a metallocene catalyzed ULDPE polyolefin plastomer/ethylene copolymer blend;

two exterior skin layers of a LLDPE/LDPE blend coextruded on either side of said core layer to form a multilayer film;

said multilayer film having a machine direction stress at 5% elongation of about 70 g/cm to about 155 g/cm; and said multilayer film having a transverse direction stress at 5% elongation of about 125 g/cm to about 145 g/cm.

19. The multilayer film of claim 18, said multilayer film having a transverse direction force relaxation of about 18% to about 23% following a 25% strain.

20. The multilayer film of claim 18, said multilayer film having a transverse direction permanent set of about 2.1% to about 2.3% following a 25% strain.

21. The multilayer film of claim 18, said multilayer film having a transverse direction force relaxation of about 19% to about 23% following a 50% strain.

22. The multilayer film of claim 18, said multilayer film having a transverse direction permanent set of about 4.9% to about 6.7% following a 50% strain.

23. The multilayer film of claim 18, wherein said core layer is about 65% to about 95% of said multilayer film thickness, and said two exterior skin layers are each about 2.5% to about 17.5% of said multilayer film thickness.

24. The multilayer film of claim 18, wherein said ethylene copolymer of said core layer is ethylene methyl acrylate.

25. The multilayer film of claim 18, wherein said ethylene copolymer of said core layer is ethylene vinyl acetate.

26. The multilayer film of claim 18, wherein said multilayer film is embossed on at least one side.

27. The multilayer film of claim 26, wherein said at least one embossed side has a 45 degree gloss of about 3.0 to about 7.0.

28. The multilayer film of claim 18, wherein said two exterior skin layers have differential release characteristics.

29. The multilayer film of claim 28, wherein one of said two exterior skin layers further comprises about 0.5% to about 5.0% siloxane resin.

30. The multilayer film of claim 28, wherein one of said two exterior skin layers further comprises about 1.25% to about 1.75% siloxane resin.

31. The multilayer film of claim 28, wherein one of said two exterior skin layers further comprises a release agent selected from the group consisting of synthetic silica, hollow glass spheres, treated talc, and cross-linked silicone particles.

32. The multilayer film of claim 18, wherein said core layer is about 55% to about 75% metallocene catalyzed ULDPE polyolefin plastomer and about 25% to about 45% EMA.

33. A method of making a multilayer film suitable for use as a substrate material for bandages, said method comprising the step of:

blending a core composition of a metallocene catalyzed ULDPE polyolefin plastomer and a ethylene methyl acrylate copolymer;

blending a skin composition of a LLDPE and a LDPE; and coextruding said core composition and said skin composition simultaneously through a slotted film casting die to form a multilayer film with a core layer and at least one skin layer.

34. The method of claim 33, further comprising the step of metal roll embossing said at least one skin layer.

35. The method of claim 33, wherein:

said step of blending said skin composition further comprises blending a first skin composition of a LLDPE and a LDPE and a second skin composition of a LLDPE, a LDPE, and a siloxane polymer; and said step of coextruding further comprises coextruding said core composition between said first skin composition and said second skin composition simultaneously through a slotted film casting die to form a multilayer film with a core layer, a first skin layer, and a second skin layer.

36. The method of claim 35, further comprising the step of metal roll embossing said second skin layer.

* * * * *

UNITED STATES PATENT AND TRADEMARK OFFICE
CERTIFICATE OF CORRECTION

PATENT NO.   : 6,440,533 B1
DATED        : August 27, 2002
INVENTOR(S)  : Carl Douglas Ray et al.

It is certified that error appears in the above-identified patent and that said Letters Patent is hereby corrected as shown below:

Column 5,
Line 6, replace "JMAG" with -- JMAC --

Signed and Sealed this

Fourteenth Day of October, 2003

JAMES E. ROGAN
*Director of the United States Patent and Trademark Office*